United States Patent [19]

Snyder

[11] 4,241,755
[45] Dec. 30, 1980

[54] ANTI-SURGE LIQUID TRANSPORTING APPARATUS

[76] Inventor: Wesley L. Snyder, 1103 Forest Home Dr., Houston, Tex. 77094

[21] Appl. No.: 853,212

[22] Filed: Nov. 21, 1977

[51] Int. Cl.³ .................. B60P 3/24; B61D 5/02; B65D 7/00
[52] U.S. Cl. .................. 137/899; 137/571; 137/581; 137/582; 222/143; 280/5 C; 220/1 V
[58] Field of Search ............... 137/571, 575, 576, 581, 137/582, 344; 220/20, 1 V; 105/360; 280/5 R, 5 C, 5 D, 5 E; 222/143

[56] References Cited

U.S. PATENT DOCUMENTS

| | | | |
|---|---|---|---|
| 1,385,836 | 7/1921 | Kerr | 220/1 V |
| 2,285,543 | 6/1942 | Thomas | 280/5 C |
| 3,023,934 | 3/1962 | Roberts | 280/5 R |
| 3,057,588 | 10/1962 | Kolbe | 137/571 X |
| 3,192,877 | 7/1965 | Wright | 105/360 |
| 3,479,043 | 11/1969 | Piehl | 105/360 X |
| 3,685,458 | 8/1972 | Price et al. | 105/360 X |
| 3,795,204 | 3/1974 | Waguespack | 105/358 |
| 3,805,829 | 4/1974 | Yamamoto et al. | 137/575 |
| 3,814,290 | 6/1974 | Gerhard | 222/143 |

Primary Examiner—William R. Cline
Attorney, Agent, or Firm—Arnold, White & Durkee

[57] ABSTRACT

A liquid transport container unit carried by a vehicle for transporting liquid products such as water or gasoline is disclosed, such unit utilizing an elongated base section positioned parallel to the direction of movement of the vehicle. This base section contains an internal chamber for containing the liquid to be transported. An elongated upper section positioned substantially parallel to the base section is also mounted to the vehicle. This upper section is elevated with respect to the base section and also has an internal chamber for receiving the liquid. A plurality of return portions are connected between the base section and the upper section and are adapted for communicating the liquid between the internal chambers of the upper and base sections.

11 Claims, 5 Drawing Figures

ANTI-SURGE LIQUID TRANSPORTING APPARATUS

BACKGROUND OF THE INVENTION

1. Field of the Invention

This invention relates generally to a novel conveyance for transporting liquids. More particularly, the invention relates to a transport container unit carried by a vehicle for transporting liquids in a manner which reduces the tendency of the liquid to surge or slosh upon acceleration (defined to be the rate of change of velocity, whether increasing or decreasing) of the vehicle when the container is only partially filled. While the invention may be used effectively on various types of vehicles, for convenience it will be discussed in connection with a motor vehicle having a need to convey a relatively small body of liquid such as a recreational vehicle and a vehicle used to convey a large amount of liquid such as a railroad tank car.

A vehicle carrying a reservoir or container partially filled with liquid is subjected to severe dynamic forces as a result of the liquid surging or sloshing within the container during movement of the vehicle. These forces are quite substantial when the vehicle is starting, stopping or making rapid changes in its velocity. Such forces are even more pronounced, when as typically is the case, the reservoir is of an elongated shape such as a tank truck with the longitudinal axis of the reservoir substantially parallel to the direction of acceleration of the vehicle. In the case of tank trucks, such surging occurs quite often when the vehicle abruptly changes speed.

The surging liquid may exert such a force against the internal walls and ends of the container as to severely damage the container or its contents. Also, when such surging does occur, the weight of the liquid is rapidly shifted to one end of the reservoir which can often result in spilling or even overturning of the entire vehicle or derailing of the tank in the case of a railroad tank car.

2. Description of the Prior Art

In the past, it has been common to provide some type of baffle means within the container in an effort to disrupt the surging flow of the liquid. These baffles have generally been used to partition the container into separate transverse compartments or units and restrict flow between these units.

One example of utilizing baffle means in a direction transverse to the surging flow is seen in U.S. Pat. No. 3,192,877 to Wright. Wright employs segments of cylindrical drums positioned across a railroad tank car to interrupt surging flow in the longitudinal direction. Another baffling system is seen in U.S. Pat. No. 3,795,204 to Waguespack. This system again attempts to position baffles across the cylindrical tank with braces positioned between the main baffles thereby obsructing longitudinal flow. Similar transverse buffer systems are seen in U.S. Pat. No. 1,832,632 to Havemeyer and U.S. Pat. No. 2,724,597 to Fowler.

One apparatus directed to transporting liquid products is the container disclosed in U.S. Pat. No. 3,023,934 to Roberts. Roberts is directed to providing a container which can be easily stored and transported by both highway trailers and water-borne means without the need of separate tank containers on each vehicle. Thus, the unit of Roberts does not address the surging problem but only attempts to provide a rigid container which is easily transferred between different types of conveyances. Roberts provides that the unit is to rest on a flat surface of the vehicle. Thus, the surging problems seen in the prior longitudinally oriented tanks also occur in the Roberts unit.

Although the prior art involves the use of baffles, such systems have consistently been positioned transverse to the expected movement of the liquid. Other containers have been provided to attempt to strengthen the structure of the reservoir and make it more adaptable to be transported by various vehicles with no provision for reducing the surging liquid flow during conveyance.

SUMMARY OF THE INVENTION

Transporting a liquid within a container by a vehicle can result in dynamic forces being developed against the internal walls and ends of the container. Accordingly, if liquid is to be transported in a partially filled reservoir, some device for reducing or eliminating the injurious effects of such surges must be developed.

Accordingly, it is the main feature of the invention to provide an assembly for transporting liquid by a vehicle which substantially reduces the harmful effects of surging liquid within the tank.

A further feature of this invention, in accordance with the immediately preceding feature, is to provide a transport container unit which, when partially filled, reduces the surging or sloshing of the liquid.

A still further feature of the invention is to provide a transport container unit which is generally compact in shape and conveniently and easily mounted on a vehicle, the unit having a plurality of return portions for equalizing the weight distribution of the liquid even during abrupt changes in speed.

Another feature of the invention is the provision of a container unit which is easily fabricated at a low cost and installed within existing vehicles.

Still another feature of the invention is the provision of a transport container unit that is readily removable to permit repair, replacement or cleaning of the individual units.

In accordance with this invention, and in order to accomplish the above recited features, there is provided a container transport unit which comprises an elongated base section having its longitudinal axis substantially parallel to the direction of movement of the vehicle. This base section contains an internal chamber for containing the liquid to be transported. A second elongated member or upper section is also mounted to the vehicle and is substantially parallel to the base section. This upper section is elevated above a horizontal plane passing through the longitudinal axis of the base section. This upper section also has an internal chamber adapted for receiving the liquid to be transported. A plurality of return portions are connected between the base section and the upper section and are adapted for communicating the transported liquid between the internal chambers of the upper and base sections upon abrupt changes in the vehicle speed.

In a more specific embodiment of the transport container unit, there is provided a means connected to the base section for charging and discharging the liquid from the container unit. In a yet more specific embodiment of the present invention, the transport container unit includes means attached to the upper section for venting the upper section during charging or discharging of the liquid from the unit.

Examples of the more important features of this invention have thus been outlined rather broadly in order that the detailed description thereof that follows may be better understood, and in order that the contribution to the art may be better appreciated. There are of course additional features of the invention that will be described hereinafter and which will also form the subject of the claims appended hereto.

BRIEF DESCRIPTION OF THE DRAWINGS

A more complete appreciation of the invention and many of the attendant features thereof will be readily appreciated as the same becomes better understood by reference to the following detailed description when considered in connection with the accompanying drawings in which like reference characters designate identical or corresponding parts throughout the several views and wherein.

DETAILED DESCRIPTION

Figure 1:
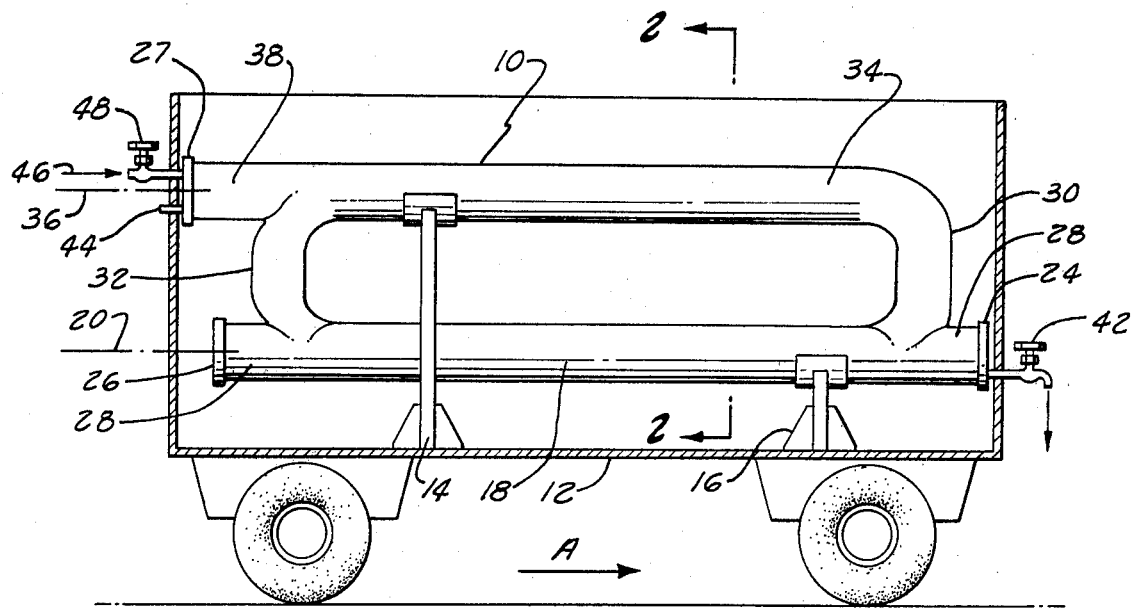
FIG. 1 is a elevation view of one embodiment of the present invention mounted on a vehicle, illustrating the longitudinal positioning of the illustrated embodiment on the vehicle.

Referring now to the drawings, and more particularly to FIG. 1 thereof, there is shown an embodiment of the invention in which a liquid container or reservoir 10 is carried by a vehicle 12, for example and without limitation a recreational vehicle such as a camper having an internal water system. Fresh water is typically carried by the vehicle 12 within a reservoir 10 attached to the body of the vehicle 12. As can be appreciated, the present invention is adaptable for use with any type vehicle having a need to transport liquid or liquid products and minimize surging movement of the conveyed liquid.

Figure 2:
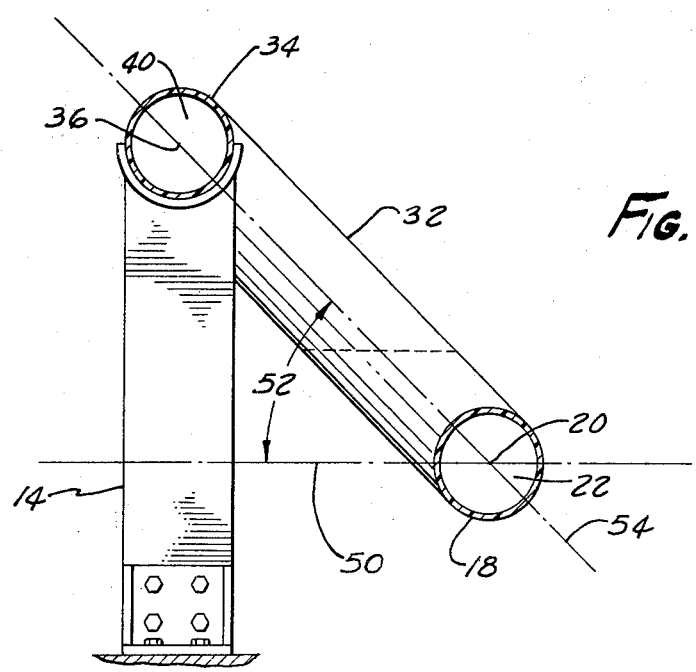
FIG. 2 is a frontal cross-sectional view of the embodiment of FIG. 1 illustrating the elevated position of the upper section with respect to the base section.

The vehicle 12 of FIG. 1 is shown with a single transport container unit 10 rigidly mounted by support bracket 14 and base support 16 to the vehicle 12. The transport container unit 10 includes an elongated base section 18 attached to the base support 16 and having its longitudinal axis 20 substantially parallel with the bed of the vehicle 12 as shown. Also, the base section 18 is mounted substantially parallel to the direction of movement of the vehicle 12 as shown by arrow A in FIG. 1. The base section 18 of the transport container unit 10 is a cylindrically shaped structure having an internal chamber 22, shown in FIG. 2. The internal chamber 22 of the base section 18 is adapted for containing the liquid to be transported in the normal operating embodiment when the liquid is stable and no surging is occurring. The internal chamber 22 of the base section 18 may extend the substantial length of the vehicle compartment and terminates with end plates 24, 26. The capacity of the transport container unit 10 may be altered by varying the length of the base section 18 to conform with the space available within the vehicle. Storage cavities 28 are formed at each end of the base section and can be easily varied in length to accommodate the desired volume of the unit.

Return portions 30, 32 are connected to the base section 18 and adapted for communicating the liquid to and from chamber 22. First return portion 30 is a cylindrical segment extending from the base section 18 and having a diameter substantially equal to the diameter of the base portion 18. The first return portion 30 is essentially a pipe section having an internal passage or cavity which is connected with the internal chamber 22 of the base portion 18.

A second return portion 32 is also connected to the base section 18 and comprises a similar cylindrical pipe segment having a diameter substantially equal to the diameter of the base section. This second return portion 32 has an internal passage connected to the internal chamber 22 of the base section 18 and adapted for communicating liquid to and from internal chamber 22 of base section 18.

Also shown in FIG. 1 is upper section 34 which is also mounted to vehicle 12 and has one of its ends connected to first return portion 30 and the region near the opposed end connected to second return portion 32. Upper section 34 is also a cylindrical pipe section having a diameter substantially equal to base section 18 and first and second return portions 30, 32. The longitudinal axis 36 of upper section 34 is mounted substantially parallel to the vehicle bed and substantially parallel to longitudinal axis 20 of the base section 18 and the direction of movement A of vehicle 12. The upper section is also adaptable for extending past either the first or second return portions thereby forming upper storage cavity 38 similar to cavities 28 of base section 18. Upper section 34 has an upper internal chamber 40 (See FIG. 2) running the substantial length of upper section 34 and connected to the internal passages of both the first and second return portions 30, 32. Thus, transport container unit 10 consists of four major sections having internal chambers connected with each other such that liquid stored within base section 18 can flow between base section 18 and upper section 34 by means of first or second return portion 30, 32.

Also in FIG. 1, means for charging base section 18 of transport container unit 10 with liquid is provided in the form of valve 42 connected to end plate 24 of base section 18. In the embodiment of FIG. 1, valve 42 is also adapted for discharging the liquid from base section 18 thereby enabling sufficient amounts of liquid to be easily stored and retrieved from transport container unit 10. Since transport container unit 10 defines a completely enclosed internal reservoir for storing the liquid, it is necessary to provide means for venting the container during filling of the container with liquid. Also, a means for allowing air or other fluid to be supplied to upper section 34 of the unit while liquid is being discharged from the reservoir is needed. The embodiment shown in FIG. 1 discloses vent 44 attached to end plate 27 of upper section 34 and adapted for allowing the passage of air during charging or filling of the transport unit with water. Also shown in FIG. 1 is means for supplying air pressure to upper section 34 thereby enabling the liquid to be discharged from valve 42 with sufficient pressure to flow to the desired sections of the recreational vehicle. An external pressure supply 46, in the form of a pressurized air cylinder (not shown) is connected to upper section 34 of transport container unit 10 by means of air valve 48 attached to end plate 26. This external supply of air pressure is sufficient to maintain above atmospheric pressure within the upper section of the transport container unit which thereby applies sufficient pressure to the liquid contained therein to force it out discharge valve 42 when opened.

As seen in FIG. 1, container unit 10 is mounted substantially parallel to the direction of movement A of the vehicle with longitudinal axes 20, 36 of both upper and base sections 18, 34 being substantially parallel thereto. However, referring to FIG. 2, it is seen that upper section 34 is positioned parallel to base section 18 yet elevated to a predetermined position above base section 18. Said another way, upper section 34, while having axis 36 parallel to axis 20, is elevated with respect to base 18 such that longitudinal axis 36 lies outside or without horizontal plane 50 containing or passing through longitudinal axis 20 of base 18.

Returning to FIG. 1, operation of the transport container unit in combination with the vehicle will be discussed. As previously mentioned, during conveyance of a liquid by a vehicle such as shown in FIG. 1, if oftentimes is necessary to accelerate in the direction shown by arrow A. If transport container unit 10 is only partially filled with liquid, this liquid will tend to surge in the direction designated by arrow A during decreasing acceleration of the vehicle. The liquid will also tend to surge in the opposed direction during start-up or acceleration of the vehicle. Upon such surging or slug movement of the liquid, such liquid will rise within one of the return portions, depending upon whether the vehicle is decelerating or accelerating and flow into upper section 34 and then in a direction opposed from its previous surging direction. Since the surging liquid attempts to exert a force on the container in this first direction, the direction of this force will be changed upwardly and dissipated or reversed when the liquid is elevated or rises in the return portion and flows in the upper section in the opposed direction. Liquid flowing in this opposed direction will tend to equalize the weight shift resulting from the slug movement. Once a portion of the liquid is within this upper section 34, it will flow into the other return portion and return to base section 18.

It has been found that a container which allows the surging liquid to dissipate its energy by rising within the unit and flowing in a direction opposed to its original movement and returning to base section 18 will greatly reduce the harmful effects of the kinetic energy resulting from such deceleration or acceleration and thereby eliminate the detrimental weight shifting and surging within the container.

It is believed that transport container unit 10 operates more efficiently to reduce liquid surging when upper section 34 is so elevated from base section 18. In the embodiment shown in FIG. 2, angle 52, designated as a tilt angle, formed by line 54 connecting axes 20 and 36 and the horizontal plane 50, is more than approximately 5°. As can be seen, liquid deposited within the transport container unit is retained in the base section during normal non-surging storage and possibly up into return position 30, 32 as shown by the liquid level in FIG. 2 if needed.

It has been determined that for effective dissipation of the kinetic energy generated by the surging fluid within the transport unit during acceleration of the vehicle in either direction, tilt angle 52 must be greater than about 5° and preferably should be of sufficient magnitude to elevate upper section 34 above base section 18 an amount at least equal to one-half the diameter of base portion 18. However, it is also believed preferable though not completely necessary that tilt angle 52 be less than 90° and upper section 34 not be located directly above base section 18. For purposes of illustration, tilt angle 52 is substantially equal to 45° enabling efficient drainage of the liquid from upper section 34 through first and second return portions 30, 32 into base section 34.

Tilt angle 52 is incorporated into the present design to enable drainage of the container unit by means of the discharge valve and allow dissipation of the kinetic energy through movement of the fluid between upper section 34 and base section 18 as will be discussed subsequently.

As can be appreciated, transport container unit 10 serves to effectively dissipate energy of the contained liquid and eliminate such surges from damaging the container or creating large shifts in the cargo weight causing damage to the vehicle itself.

Once the energy of the surging fluid has been dissipated, the liquid in upper section 34 will flow downwardly through return portions 30, 32 into base section 18 and remain there until moved again by acceleration or deceleration of the vehicle.

Although the previous discussion has been directed to preventing forces resulting from liquid movement in a direction parallel to longitudinal axes 20, 36, it can be appreciated that the present invention also greatly reduces lateral shifting or later forces in a direction normal to axes 20, 36. Since the liquid is contained within elongated containers, movement or sloshing of liquid in the direction transverse to the longitudinal axes is also greatly reduced.

Figure 3:
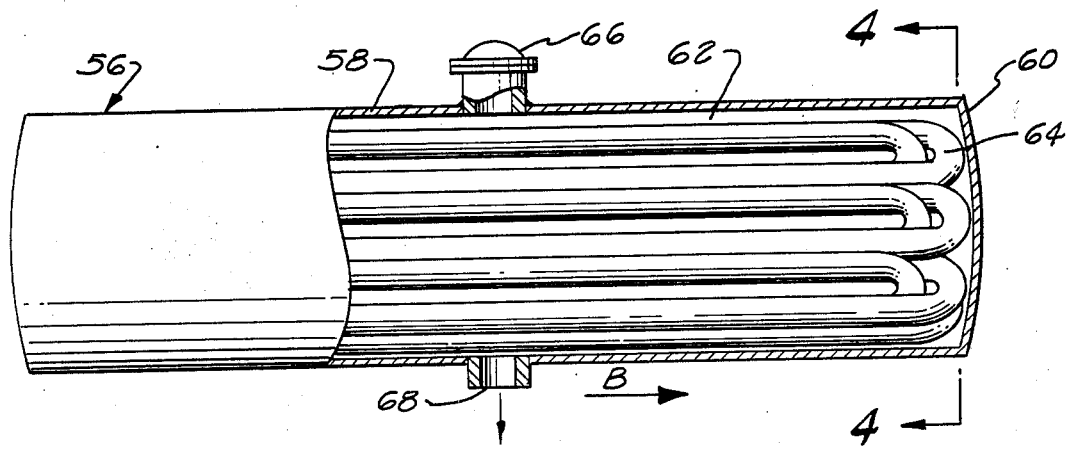
FIG. 3 is a partial cross-sectional view of a second embodiment relating to a tank car having multiple transport units located therein.
Figure 4:
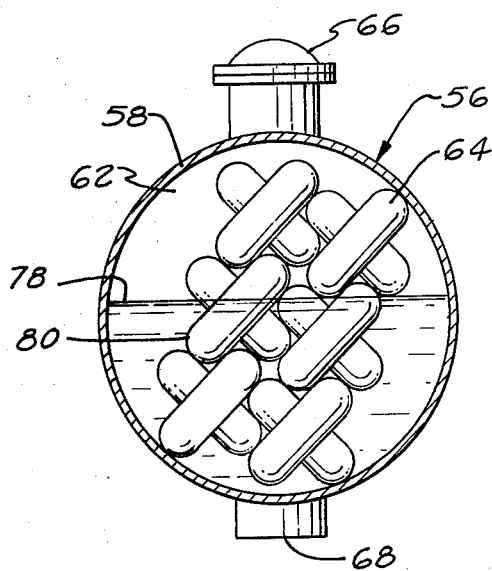
FIG. 4 is a frontal sectional view of the tank car shown in FIG. 3, showing the relative positions of the container units.
Figure 5:
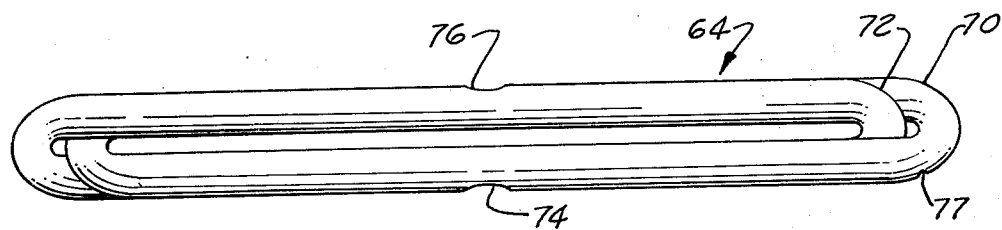
FIG. 5 is a plan view of two container units oriented as depicted in FIG. 4, this view illustrating the inlet and outlet ports located in each of the container units.

Referring now to FIGS. 3–5, a transport container assembly is disclosed utilizing multiple transport container units as previously described. Multiple units are adapted for use with larger vehicles designed for transporting large volumes of liquid products, as for example tank trucks or railroad tank cars.

In FIG. 3 there is shown a railroad tank car 56 having a cylindrical tank wall 58 with circular end plates 60 forming internal chamber 62 adapted for containing the liquid to be conveyed. It can be appreciated that even though a tank car such as utilized on railroads is disclosed in FIG. 3, such a container can be easily adapted for use with tank trucks, ships or other type vehicles adapted for conveying liquid.

Within tank car 56 a plurality of container units or bundles 64 have been enclosed and adapted for receiving and discharging liquid deposited within tank car 56.

As seen in FIG. 3, container bundles 64 are positioned within tank car 56 such that the longitudinal axis of each of the container units is substantially parallel with the longitudinal axis of the tank car, the tank car being designed for conveyance in a direction also substantially parallel to its longitudinal axis, shown by arrow B.

A loading port 66 is positioned in the upper portion of tank car 56 and adapted for receiving the liquid to be transported. A main drain port 68 is provided along the bottom of tank truck 56 thereby allowing the fluid to be easily discharged from the tank.

Now referring to FIG. 4, there is shown tank car 56 and transport container bundles 64 shown in FIG. 3. As can be seen in FIG. 4, each of the container units making up bundles 64 are again oriented at a tilt angle substantially more than 0°. Each of the base sections of the container units shown in FIG. 4 are substantially parallel to the direction of movement of the tank car with the cylindrical upper section substantially parallel to and elevated to a predetermined position above its corresponding base section as disclosed in connection with the embodiment of FIGS. 1–2. This upper section again has an internal chamber adapted for receiving fluid as previously discussed.

As more clearly seen in FIG. 5, each of the bundles 64 consist of a first container unit 70 and a second container unit 72 looped one within the other. Such looping of container units enables each of the individual units to be oriented at a tilt angle sufficient to allow proper operation of the unit in dissipating energy of the fluid contained therein.

It can be appreciated that although bundle 64 disclosed in FIG. 5 consists only of two container units, it is contemplated that more than two such units may be looped or positioned together such that a plurality of units may form a bundle or a series of bundles having the proper tilt angle.

Each of the container units of FIG. 5 has a means connected to its base portion for charging and discharging the liquid into and from its base portion. In FIG. 5 this discharging means is shown as outlet hole 74 positioned along the lowermost portion of unit 70 thereby enabling liquid to flow from the container unit. Also connected to each of the container units along its upper section is means for passing liquid into the upper internal chamber during charging or discharging of the liquid. The unit shown in FIG. 5 employs inlet hole 76 adapted for passing liquid or venting air as the unit is filled by causing the liquid to build up from the tank's bottom portion.

During operation, tank car 56 is filled either through loading port 66 or main drain port 68 such that liquid is deposited along the bottom internal portion of the tank car and allowed to accumulate and form a liquid level line within the tank car. As can be understood, when this liquid level approaches the lowermost portion of each of the individual container units as seen in FIG. 4, the fluid will flow into outlet holes 74 and gradually fill the base section of each unit as the liquid rises to submerge the unit and as air is vented from the inlet hole. If sufficient liquid is changed into the tank 56, the liquid level will rise above the base portion of an individual container unit and cause liquid to flow up the first and second return portions and into the upper section. Those container units positioned below the liquid level will be completely submerged while those located at the liquid level will be partially filled. If the entire tank car is filled with liquid, all container units will be filled having their base section, upper section and both return portions filled with liquid. In such a situation, in which the entire tank is filled, there will be no liquid surge during acceleration of the vehicle and thereby no need for dissipating any energy. However, in the situation where tank car 56 is only partially filled, the liquid level will be located such that a series of container units positioned along the liquid line will also be partially filled. For example, in FIG. 4 liquid level line 78 represents tank 56 being approximately 50% filled. As can be seen those container units located along line 78 are only partially filled. Unit 80 is positioned such that its base section and possibly a portion of its return portions are filled with liquid and its upper section containing no liquid. When units such as 80 are partially filled, they will operate as previously described for the embodiment of FIG. 1 to dissipate energy of the surging fluid upon acceleration or deceleration of the vehicle.

Returning now to the embodiment shown in FIG. 1, it can be appreciated that if a single transport container unit is employed as a liquid reservoir on a vehicle, it will be advantageous to have the entire unit positioned such that base section 18 is tilted such that discharge valve 42 is at a lower elevation than the remainder of the unit. In other words, base section 18 is tilted a slight amount in the direction of discharge valve 42 thereby enabling all liquid within base section 18 to flow in the direction of discharge valve 42 when the vehicle is operating in a normal, nonsurging mode thereby enabling the last remaining portion of the liquid to be discharged. For similar reasons, it is anticipated that small drain ports 77, see FIG. 5, may be installed in each of the container units 70, 72 to facilitate complete discharge of the liquid.

The foregoing description of the instant invention has been directed to particular preferred embodiments of the present invention for purposes of explanation and illustration. It will be apparent, however, to those skilled in this art, that many modifications and changes in the apparatus may be made without departing from the scope and spirit of the invention. It is therefor intended that the following claims cover equivalent modifications and variations as fall within the scope of the invention as defined by the claims.

What is claimed:

1. A wheeled transport container unit for transporting liquid comprising:
    an elongate base section having its longitudinal axis substantially parallel to the direction of movement of the vehicle, said base section having a base internal chamber for containing at least a portion of the liquid;
    a plurality of return portions connected to said base section, each of said return portions having an internal passage connected to said base internal chamber for communicating the liquid between the internal passages and the base internal chamber;
    an elongate upper section connected to said return portions and substantially parallel to said base section and having an upper internal chamber adapted for communicating liquid between the internal passages of said return portions, said upper section being elevated with respect to said base section such that the longitudinal axis of said upper section lies without a horizontal plane containing the longitudinal axis of said base section, said base internal chamber and said upper internal chamber having substantially similar cross-sectional areas, wherein said base and internal chambers and said internal passages define a circulation path for the liquid to minimize surging effects of the liquid upon vehicle acceleration,
    support structure for supporting the upper section elevated from the base section during transport; and
    a set of wheels for transporting the support structure, the set of wheels being connected to the support structure for maintaining the support structure at an orientation whereby the upper section is elevated from the base section during transport.

2. A transport container unit as recited in claim 1 wherein the internal passages of the return portions have circular cross-sections substantially equal to the cross-section of the base internal chamber and wherein the upper section is elevated above the base section by an amount at least equal to one-half the diameter of said circular cross-sections.

3. A transport container unit as recited in claim 1 further including:
   means connected to said unit for passing the liquid to and from the unit; and
   vent means connected to said unit for venting said unit during charging or discharging of the unit with liquid.

4. A transport container unit as recited in claim 1 further including means for pressurizing the upper internal chamber an amount sufficient to effectively discharge the liquid from said lower internal chamber.

5. For use with a vehicle adapted for transporting liquids within an elongated tank which is conveyed parallel to the direction of movement of the vehicle, a plurality of open container units mounted within the tank for reducing the harmful effects of surging flow of the liquid within the tank, each of said container units comprising:
   a cylindrical base section having its longitudinal axis substantially parallel to said tank, said base section having a base internal chamber for containing at least a portion of the liquid;
   a plurality of return portions connected to said base section, each of said return portions having an internal passage for communicating the liquid between the internal passages and the base internal chamber, connected to the base internal chamber;
   a cylindrical upper section connected to said return portions and substantially parallel to the base section and having an upper internal chamber adapted for communicating liquid between the internal passages of said return portions, said upper section being elevated with respect to said base section such that the longitudinal axis of the upper section lies without a horizontal plane containing the longitudinal axis of said base section, said cylindrical upper section elevated above said cylindrical base section by an amount at least equal to one-half the diameter of said cylindrical base section;
   the base section of each said container unit defining an uncovered opening for freely passing the liquid in and out of the unit during transporting; and
   the upper section of each said container unit defining an uncovered opening for venting said unit during charging and discharging of the unit with liquid through the opening in said base section during transporting, wherein said base and internal chambers and said internal passages define an open circulation path for the liquid to minimize surging effects of the liquid upon vehicle acceleration.

6. A wheeled container for transporting fluid, comprising:
   (a) a set of wheels;
   (b) a support structure connected to said set of wheels and supported thereby in a given orientation during transporting; and
   (c) liquid carrying structure supported by said support structure for providing a recirculating, closed passage for the liquid, said liquid carrying structure defining at least one closeable opening for introducing the liquid into the passage, said liquid carrying structure further defining said passage to be of a substantially uniform cross-sectional area, whereby surging effects of the liquid on the vehicle are minimized by the liquid circulating within said passage, wherein said liquid carrying structure defines first and second major portions of said passage to have axes substantially parallel to the direction of movement of the vehicle, and wherein said support structure supports said liquid carrying structure to maintain said axes in a non-horizontal plane when the support structure is in said given orientation during transporting.

7. The container according to claim 6 wherein said liquid carrying structure defines a major portion of said passage to have an axis substantially parallel to the direction of movement of the vehicle.

8. The container according to claim 6 wherein said liquid carrying structure comprises an endless tube having a uniform cross-sectional area.

9. The container according to claim 6 wherein said liquid carrying structure includes means for selectively closing said at least one opening.

10. The container according to claim 6 wherein said passage is circular and said axes are separated by an elevation at least as great in value as one-half the diameter of said circular passage.

11. A container for transporting liquid via a vehicle, comprising:
   (a) an enclosed tank supported by said vehicle and adapted to be at least partially filled with a liquid; and
   (b) at least a pair of liquid carrying structures disposed within said enclosed tank for providing at least a pair of recirculating, open passages for the liquid, each of said liquid carrying structures defining at least one uncovered opening for introducing liquid from within said enclosed tank into the respective passage, each said liquid carrying structure further defining first and second major portions of said passage and each of the major portions having an axis substantially parallel to the direction of movement of the vehicle, said liquid carrying structure defining said first and second major portions to have substantially similar cross-sectional circular areas, with the axes of the first and second major portions being separated by an elevation at least as large as one-half the diameter of said cross-sectional areas, said liquid carrying structures further defining minor portions connecting said major portions configured to elevate the liquid upon acceleration of deceleration of the vehicle to cause fluid circulation through said passages, whereby surging effects of the liquid on the vehicle are minimized by the liquid circulating within said passages.

* * * * *